UNITED STATES PATENT OFFICE.

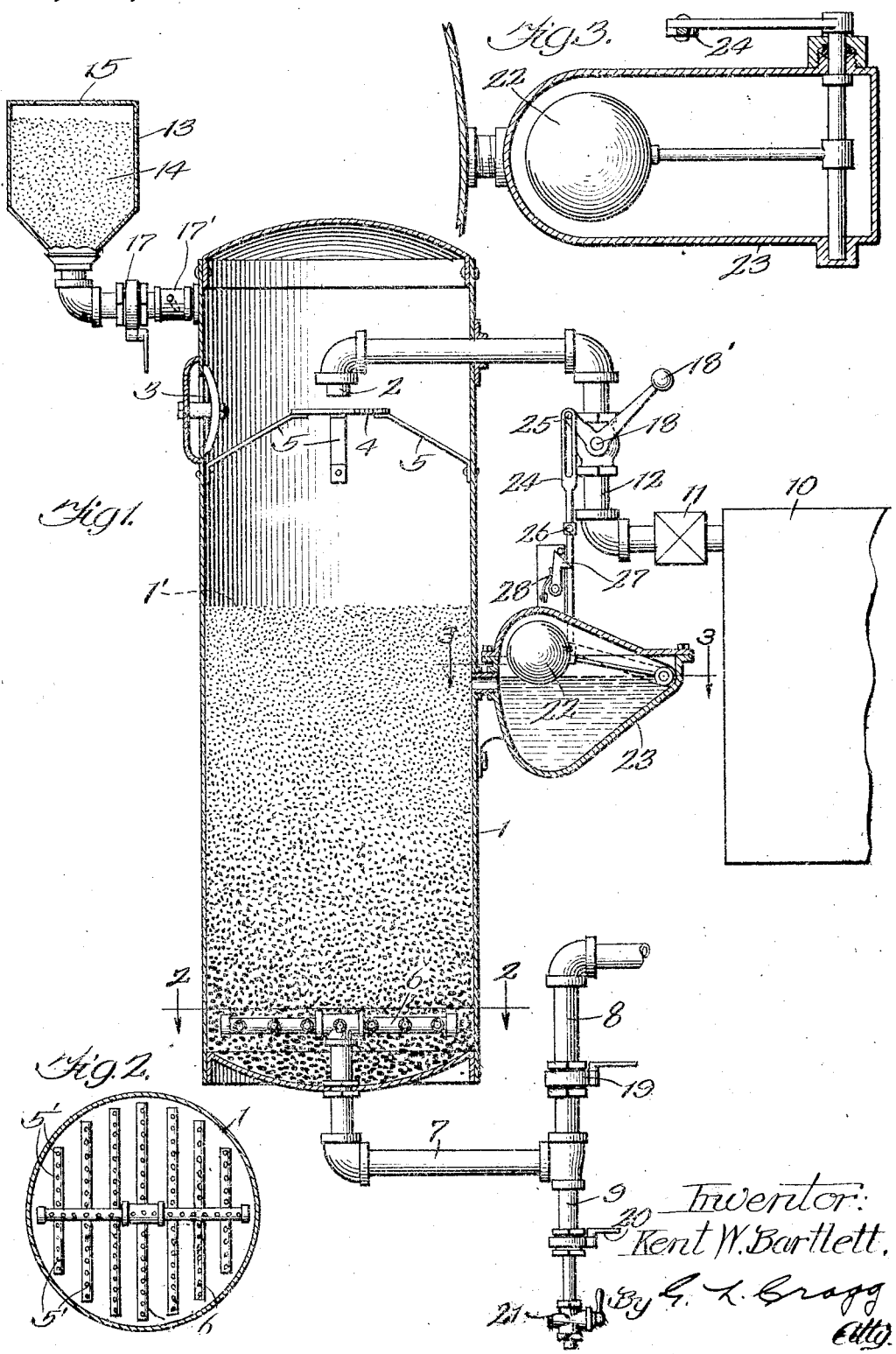

KENT W. BARTLETT, OF HAMMOND, INDIANA.

LIQUID-TREATING APPARATUS.

1,233,017.  Specification of Letters Patent.  Patented July 10, 1917.

Application filed November 9, 1916. Serial No. 130,344.

*To all whom it may concern:*

Be it known that I, KENT W. BARTLETT, citizen of the United States, residing at Hammond, in the county of Lake and State of Indiana, have invented a certain new and useful Improvement in Liquid-Treating Apparatus, of which the following is a full, clear, concise, and exact description, reference being had to the accompanying drawings, forming a part of this specification.

My invention relates to liquid treating apparatus and is of particular service in the softening of hard water, though the invention is not to be limited to any use to which it may be put. My invention is useful in connection with that class of apparatus in which liquid treating chemical is permanently disposed within liquid treating tanks and which liquid treating chemical is of such a nature that it may be regenerated by regenerating chemical passed into the tank from time to time, there being means for removing the products of regeneration from the tank.

It has been the practice to soften hard water by providing a mass of zeolite (sodium or potassium hydrated aluminum silicate) in a water softening tank, zeolite having the property of softening the water passing therethrough as will be understood by those skilled in the art. In the course of, say, a half day, the zeolite becomes spent and requires regeneration, to which end sodium or potassium chlorid, or both are placed in the tank in excess of the amount necessary to effect required chemical reaction. The regenerating chemical has been allowed to remain in the tank either in static condition during the regenerating process or has been permitted to flow through the tank in large volume during the regenerating process, the products of regeneration and the excess of the regenerating chemical having to be removed by washing after the regenerating process has been concluded. The washing process does not commence until the regenerating process or processes are concluded, manual operation having hitherto been required to effect the initiation of the washing process. In such process, the products of regeneration and the excess of regenerating chemical are washed from the tank, usually by reestablishing the flow to the tank of water from the source that furnishes the water to be treated. For example, in the softening of hard water the water softening process would be commenced at seven a. m. and would be concluded at five p. m., at which latter hour the regenerating process would be initiated. This regenerating process would be concluded about three a. m., making it necessary for an attendant to start the washing process sufficiently in advance of seven a. m. to place the apparatus in renewed condition for the softening of water. In accordance with my invention, I provide mechanism for automatically starting the washing process at the conclusion of the regenerating process so that the apparatus will be in condition for another run at seven a. m. the succeeding day. This automatic mechanism is desirably governed by the liquid that is preferably permitted slowly to flow from the tank during the regenerating process and while the inflow of washing liquid is stopped or sufficiently obstructed to allow the level of the liquid in the tank to lower during the regenerating process. The liquid level is sufficiently lowered at the conclusion of the regenerating process to operate a float mechanism that renews or establishes the free flow of water to the tank to wash out the products of regeneration and the excess of regenerating chemical. This washing liquid is desirably obtained from the source from which the liquid to be treated is derived after the washing process is concluded. The washing process thus automatically initiated at the conclusion of the regenerating process, is finished in ample time for the start of a new run through the tank of liquid to be treated.

I will explain my invention more fully by reference to the accompanying drawing in which Figure 1 is a view in elevation, partially in section, of apparatus made in accordance with the preferred embodiment of the invention; Fig. 2 is a view on line 2—2 of Fig. 1; and Fig. 3 is a view on line 3—3 of Fig. 1.

Like parts are indicated by similar characters of reference throughout the different figures.

The tank 1 is of suitable shape, there being an opening 2 for admitting the liquid that is to be treated, such as hard water. The liquid treating chemical, such as a suitable zeolite, is admitted to the tank through the opening 3 and is supplied to the tank up to substantially the level indicated in Fig. 1 at $1^1$. The incoming liquid falls upon a baffle plate 4 supported upon a spider 5, the baffle plate operating to subdivide the liquid so that it will not form a definite channel through the liquid treating chemical but will rather seek all parts of the chemical in its downward passage through the tank. The liquid finds exit from the tank through a number of openings $5^1$ that are formed in branch pipes 6 which have a common outlet in the piping 7. Piping 8 branches in one direction from pipng 7 to convey treated liquid from the tank, and piping 9 branches in another direction from the piping 7 to convey the waste liquid from the tank. The source of supply from which the liquid to be treated is furnished may be of any nature such as a city water main, the tank 10 being, however, indicated in Fig. 1 to illustrate one form of supply. When the supply tank is employed, a pump 11 is desirably used to force the water through the pipe 12 to effect the forcible entry of the water at the opening 2 into the tank 1. The regenerating chemical, such as sodium or potassium chlorid, may be disposed in a supply box 13 as indicated at 14, this supply box having a hole 15 through which this regenerating chemical may be passed into the box 13. Any suitable valve 17 may be employed normally to hold the regenerating chemical 14 in the box 13 in readiness to be discharged in the tank 1 when regeneration of the liquid treating chemical is to be commenced. A valve 18 is employed to permit or prevent the passage of liquid from the source of supply 10 to the tank 1. Another valve 19 is employed to prevent or permit the passage of liquid through the piping 8 that is provided solely for the purpose of permitting the passage of the treated liquid. A valve 20 operates to convey liquid from the tank when the valve 19 is closed, the valve 20 being closed when liquid is to flow through the piping 8.

During the liquid treating process the valve 18 is opened and no regenerating chemical is being received into the tank, to which end the valve 17 is closed, particularly if any regenerating chemical remains in the container 13. A check valve $17^1$ may be provided to prevent the back flow of liquid into the container 13 in the event of the valve 17 being open, the valve $17^1$ permitting the flow of regenerating chemical into the tank 1 from the container 13. The treated liquid passes through the piping 6, 7 and 8, the valve 19 being open during the liquid treating process and the valve 20 being closed. After the zeolite has become sufficiently ineffective or after the conclusion of a run, the valves 18 and 19 are closed and the valves 17 and 20 are opened, regenerating chemical then finding access to the tank 1. At this time the tank 1 is full of the water or liquid obtained from the source 10, this liquid combining with the regenerating chemical to regenerate a liquid treating chemical. The mixture of regenerating chemical and liquid is allowed to pass from the tank 1 at a slow rate of speed during the regenerating process, the total discharge of the liquid from the tank 1 being effected after the regenerating process is concluded. To this end I provide a regulating cock 21 for regulating the speed with which the products of regeneration and the excess regenerating chemical may be discharged from the tank 1. After the regeneration has been finished the level of liquid in the tank 1 reaches a point where the float 22 will become lowered, this float being contained in a float chamber 23 that is in communication with the interior of the tank 1. This float operates mechanism for opening the valve 18 to admit washing liquid into the tank 1, this washing fluid being desirably obtained from the same source 10 that furnishes the liquid that is to be treated. The float 22 operates the valve 18 to open the same through any suitable mechanism which is in lost motion relation with the valving mechanism so that the valve 18 may be opened or closed when the float 22 is in an elevated position, the handle $18^1$ being provided upon the valve 18 for manual operation of the valve. In Fig. 1 the valve 18 is shown in a closed position. It may be thrown to an open position by swinging handle $18^1$ to the other side of the valve center. In the regenerating process a fixed quantity of water is admitted through the pipe 2 for combination with the regenerating chemical, after which the valve 18 is closed by placing the handle $18^1$ in the position shown, the valve 19 then being also closed while the valve 20 is open. The flow regulating cock 21 may remain in fixed open position that is adjusted to secure the desired slow exit of waste water from the tank 1 as the regenerating process proceeds. The valve 18 being closed, the level of the liquid in the tank 1 will gradually lower until finally the float 22 is permitted to descend. In descending this float 22 pulls downwardly upon the link 24 that has pin and slot or lost motion connection at 25 with the handle mechanism of the valve 18. When the float has sufficiently descended the valve 18 is opened and washing water enters the tank 1 at the entrance opening 2. This washing water will ultimately rise to the top of the tank 1 but will be prevented from reaching the container 13 owing to the check valve $17^1$. At this time the float 22 will have to be held in its lowered position, to which end I provide a pin 26 which is caught by the latch 27 when the float 22 is brought to a lowered position, this latch being pressed inwardly to an inward limiting position by a spring 28. When the latch 27 engages the pin 26, the valve 18 cannot be closed but when it is desired to elevate the rod 24 to release it from its position in which it holds the valve 18 open the latch 27 may be pressed outwardly against the force of the spring 28 to disengage it from the pin 26.

While I have herein shown and particularly described the preferred embodiment of my invention I do not wish to be limited to the precise details of construction shown as changes may readily be made without departing from the spirit of my invention but having thus described my invention I claim as new and desire to secure by Letters Patent the following:—

1. In a liquid treating apparatus, the combination with a chemical and liquid holding and receiving tank; of a valve permitting and preventing the admission of washing liquid to said tank, there being an outlet permitting the exit of liquid from said tank; mechanism for opening the valve and inclusive of a float in the liquid, said float having connection with the valve to open the same when the level of the liquid in the tank is sufficiently lowered; and a latch that is brought into holding relation to the float when lowered to valve opening position.

2. In a liquid treating apparatus, the combination with a chemical and liquid holding and receiving tank; of a valve permitting and preventing the admission of washing liquid to said tank, there being an outlet permitting exit from said tank of liquid; mechanism for opening the valve and inclusive of a float in the liquid, said float having connection with the valve to open the same when the level of the liquid in the tank is sufficiently lowered; and a latch that is brought into holding relation to the float when brought to valve opening position.

In witness whereof, I hereunto subscribe my name this 7th day of November, A. D. 1916.

KENT W. BARTLETT.